United States Patent [19]

Arendt

[11] Patent Number: 4,626,098

[45] Date of Patent: Dec. 2, 1986

[54] COPYING FRAME FOR PRODUCING OFFSET PLATES

[75] Inventor: Franz Arendt, Walldorf, Fed. Rep. of Germany

[73] Assignee: Heidelberger Druckmaschinen AG, Heidelberg, Fed. Rep. of Germany

[21] Appl. No.: 779,142

[22] Filed: Sep. 23, 1985

[30] Foreign Application Priority Data

Sep. 22, 1984 [DE] Fed. Rep. of Germany ....... 3434829

[51] Int. Cl.$^4$ .............................................. G03B 27/04
[52] U.S. Cl. ........................................ 355/85; 355/87; 355/91
[58] Field of Search ....................... 355/85, 87, 91, 92, 355/93, 94, 73, 76

[56] References Cited

U.S. PATENT DOCUMENTS

| | | | |
|---|---|---|---|
| 2,975,694 | 3/1961 | Pell | 355/87 |
| 3,625,611 | 12/1971 | Orr et al. | 355/91 |
| 4,029,404 | 6/1977 | Mizukami et al. | 355/91 |
| 4,089,603 | 5/1978 | Jacobs | 355/87 |

Primary Examiner—Monroe H. Hayes
Attorney, Agent, or Firm—Herbert L. Lerner; Laurence A. Greenberg

[57] ABSTRACT

A copying frame machine for producing offset plates includes a rubber cover, a copying frame having a glass plate superimposable on the rubber cover so as to sandwich and lock therebetween an offset printing plate, a film and a sheet of copying material, means for applying a vacuum between the rubber cover and the glass plate, and vibration-generating means for applying vibration to at least one of the glass plate and the rubber cover.

2 Claims, 3 Drawing Figures

COPYING FRAME FOR PRODUCING OFFSET PLATES

The invention refers to a copying frame for producing offset plates.

Offset plate copying devices are formed of a vacuum contact frame for holding a printing copy or original to be printed, film or film assemblies and a printing plate as well as light sources. The printing copy or original to be printed and the printing plate are in close contact in the contact frame during exposure to illumination. By means of a vacuum pump, the air between a glass plate and a rubber cover is evacuated. Development of vacuum between the glass plate and the rubber cover is accelerated by electromotively driven circulating rubber roller systems. These rubber roller systems run beneath the contact surface and drive out the excess air between the printing plate and the printing copy or original.

It is accordingly an object of the invention to provide a copying frame which achieves a considerable reduction of the vacuum-applicating time and improves the vacuum for producing film and plate copies.

With the foregoing and other objects in view, there is provided, in accordance with the invention, a copying frame machine for producing offset plates comprising a rubber cover, a copying frame having a glass plate superimposable on the rubber cover so as to sandwich and lock therebetween an offset printing plate, a film and a sheet of copying material, means for applying a vacuum between the rubber cover and the glass plate, and vibration-generating means for applying vibration to at least one of the glass plate and the rubber cover.

In accordance with a concomitant feature of the invention, the vibration-generating means comprise a subfractional-horsepower electric motor disposed on the glass plate.

The forced vibration of the glass plate or the rubber cover, more specifically, by means of an electric motor enables air inclusions to be forced out in an advantageous manner when the copying frame is closed. A considerably improved vacuum is produced. This improvement of the vacuum results in more exact flat positioning of the film or the offset plate. This also prevents under-exposure, and consequently reduces the number of scrap copies to a minimum. Furthermore, the vacuum required between the glass plate and the copying material or original can be produced considerably faster. This results in a reduction in cycling periods and a considerable increase in productivity.

Other features which are considered as characteristic for the invention are set forth in the appended claims.

Although the invention is illustrated and described herein as embodied in a copying frame for producing offset plates, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
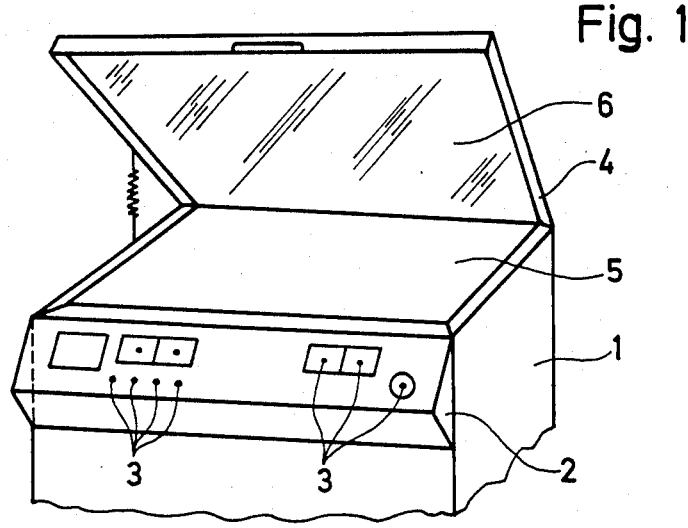
FIG. 1 is a perspective view of an offset plate copying machine with the glass plate cover thereof in raised position.

Referring now to the drawing and first, particularly, to FIG. 1 thereof, there is shown an offset plate copying machine 1. A panel 2 with various otherwise non-illustrated conventional control elements 3 is arranged on the front of the offset plate copying machine 1. The actual copying frame 4, illustrated in FIG. 1 in open position, forms the upper part of the offset plate copying machine 1. This copying frame 4 serves to receive thereon a non-illustrated printing plate and a film. The copying material is placed between a rubber cover 5 and the copying glass plate 6. The copying frame 4 is then closed and evacuated, for example, through a non-illustrated opening formed in the rubber cove 5.

Figure 2:
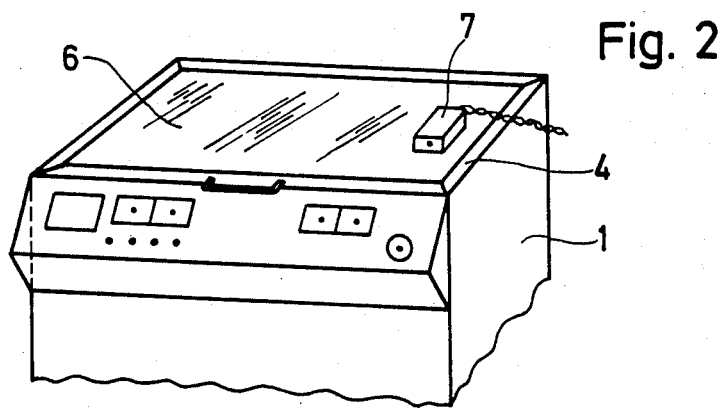
FIG. 2 is a view similar to that of FIG. 1 of the copying machine with the glass plate cover thereof in lowered position and with a motor disposed on the glass plate.

FIG. 2 shows the copying frame 4 of the offset plate copying machine 1 in closed position. A subfractional-horse power electric motor 7 is arranged on the front surface of the copying glass plate 6. It is bonded by a suitable adhesive in an advantageous manner to the glass plate. Other types of fasteners such as clip connections or guide rails are also conceivable. Any other position of the copying glass plate 6 is suitable for mounting the vibration-generating subfractional-horse power electric motor 7 in order to produce vibrations in the copying glass plate 6.

Figure 3:
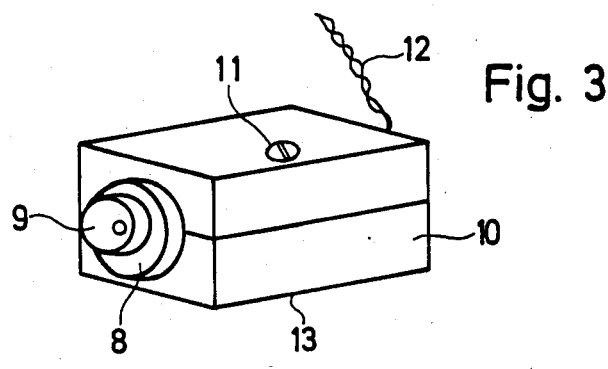
FIG. 3 is a perspective view of the motor of FIG. 2 disposed in a clamping sleeve.

FIG. 3 shows the subfractional-horse power electric motor 7. The subfractional-horse power electric motor 7 is mounted on a shaft 8. An eccentric projection 9 is located at the end of this shaft 8. A vibration is generated in the copying glass plate 6 by this eccentric projection 9 which produces an imbalance. The shaft 9 and the subfractional-horse power electric motor 7 are enclosed or surrounded by a clamping sleeve 10 which is clamped by means of a screw 11. On the opposite side of the eccentric projection 9, suitable recesses or openings are provided for current supply lines 12 for the subfractional-horse power electric motor 7.

I claim:

1. In a copying frame machine for producing offset plates, the improvement comprising a rubber cover, a copying frame having a glass plate superimposable on said rubber cover so as to sandwich and lock therebetween an offset printing plate, a film and a sheet of copying material, means for applying a vacuum between said rubber cover and said glass plate, and vibration-generating means for applying vibration to at least one of said glass plate and said rubber cover.

2. Copying frame machine according to claim 1 wherein said vibration-generating means comprise a subfractional-horsepower electric motor disposed on said glass plate.

* * * * *